US011697385B2

(12) United States Patent
Son et al.

(10) Patent No.: US 11,697,385 B2
(45) Date of Patent: Jul. 11, 2023

(54) CRASH PAD FOR VEHICLE AND MANUFACTURING METHOD THEREOF

(71) Applicant: HYUNDAI MOBIS CO., LTD., Seoul (KR)

(72) Inventors: Chang Wan Son, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 338 days.

(21) Appl. No.: 17/038,267

(22) Filed: Sep. 30, 2020

(65) Prior Publication Data

US 2021/0101550 A1 Apr. 8, 2021

(30) Foreign Application Priority Data

Oct. 2, 2019 (KR) .......................... 10-2019-0122227

(51) Int. Cl.
*B60R 21/045* (2006.01)
*B60R 21/2165* (2011.01)
(Continued)

(52) U.S. Cl.
CPC .............. *B60R 21/045* (2013.01); *B29B 9/02* (2013.01); *B29B 11/06* (2013.01); *B29C 44/1228* (2013.01); *B29C 44/42* (2013.01); *B32B 3/30* (2013.01); *B32B 5/20* (2013.01); *B32B 27/065* (2013.01); *B32B 27/304* (2013.01); *B32B 27/32* (2013.01); *B32B 27/40* (2013.01); *B60R 21/205* (2013.01); *B60R 21/2165* (2013.01); *B29L 2031/3008* (2013.01); *B32B 2605/003* (2013.01)

(58) Field of Classification Search
CPC ...... B60R 21/04; B60R 21/045; B60R 21/205; B60R 21/215; B29B 11/06; B32B 27/065; B29C 44/12
See application file for complete search history.

(56) References Cited

U.S. PATENT DOCUMENTS 6,045,732 A * 4/2000 Nakatsuji .............. B29C 43/183
264/46.4
9,744,931 B2 8/2017 Son et al.
(Continued)

FOREIGN PATENT DOCUMENTS

| CN | 104890584 A | 9/2015 |
| KR | 10-2015-0135708 A | 12/2015 |

OTHER PUBLICATIONS

Chinese Office Action dated Jul. 15, 2022, in counterpart Chinese Patent Application No. 202011031503.7 (7 pages in Chinese).

*Primary Examiner* — James A English
(74) *Attorney, Agent, or Firm* — NSIP Law (57) ABSTRACT

The present disclosure relates to a crash pad for a vehicle and a manufacturing method thereof. In an embodiment, the crash pad for a vehicle includes: a skin layer configured to form an outer surface of a crash pad including an airbag module; a core layer formed on a lower surface of the skin layer; and a foam layer formed between the core layer and the skin layer, wherein the skin layer has a tensile strength of 15 to 120 kgf/cm² and an elongation at break of 50 to 700% measured in accordance with JIS K6301 standard, and a bonding strength of 0.25 kgf/cm or more as measured in accordance with ISO 813 standard.

9 Claims, 5 Drawing Sheets

100

(51) Int. Cl.
   *B32B 5/20*      (2006.01)
   *B32B 27/06*     (2006.01)
   *B32B 27/40*     (2006.01)
   *B32B 27/32*     (2006.01)
   *B32B 27/30*     (2006.01)
   *B32B 3/30*      (2006.01)
   *B29B 11/06*     (2006.01)
   *B29C 44/12*     (2006.01)
   *B29C 44/42*     (2006.01)
   *B29B 9/02*      (2006.01)
   *B60R 21/205*    (2011.01)
   *B29L 31/30*     (2006.01)

(56) References Cited

U.S. PATENT DOCUMENTS

| | | | |
|---|---|---|---|
| 2004/0116646 A1* | 6/2004 | Choi | C08G 18/4252 264/28 |
| 2012/0223512 A1* | 9/2012 | Barr | B60R 21/2165 280/743.1 |
| 2015/0251620 A1* | 9/2015 | Son | B60R 21/04 280/728.1 |
| 2018/0118913 A1* | 5/2018 | Son | C08L 69/00 |
| 2020/0216602 A1* | 7/2020 | Son | C08G 18/0895 |

\* cited by examiner

Example 1

CRASH PAD FOR VEHICLE AND MANUFACTURING METHOD THEREOF

CROSS-REFERENCE TO RELATED APPLICATION

This application claims priority from and the benefit of Korean Patent Application No. 10-2019-0122227, filed on Oct. 2, 2019, which is hereby incorporated by reference for all purposes as if set forth herein.

BACKGROUND

Field

Exemplary embodiments of the present disclosure relate to a crash pad for a vehicle and a method of manufacturing the same and more particularly, to a crash pad for a vehicle capable of omitting a skin scoring process for deploying an airbag, and a method of manufacturing the same.

Discussion of the Background

A crash pad, also called as an instrument panel, is a vehicle interior part and is attached to the bottom of the glass in front of the driver's seat. An airbag is mounted in the crash pad. When a vehicle accident occurs, the airbag is deployed through a seam line of the crash pad and serves to protect the occupant's life from external impact. Thus, the airbag is a very important part in terms of design, convenience, and stability.

Figure 1:
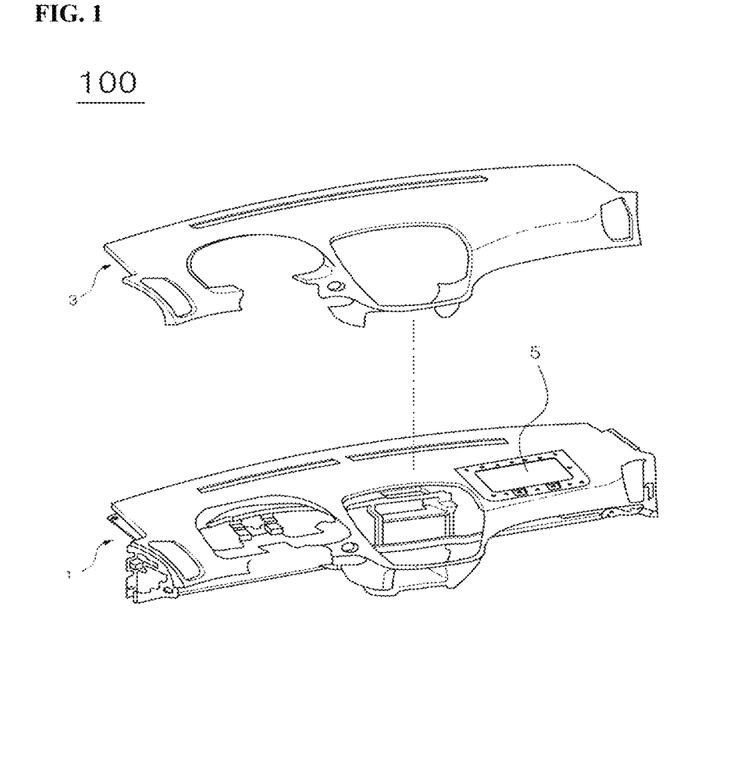
FIG. 1 illustrates a conventional crash pad for a vehicle.
Figure 2:
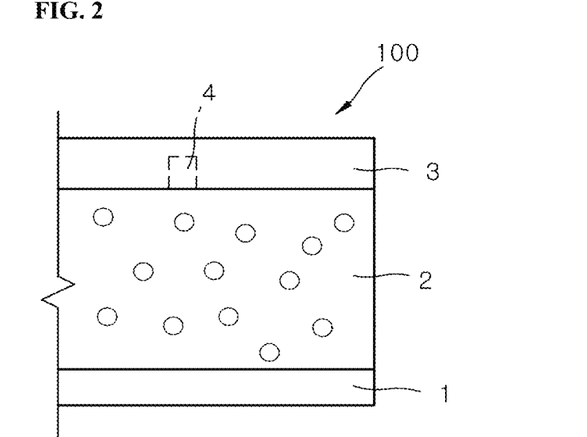
FIG. 2 illustrates the cross-section of the conventional crash pad for a vehicle.

FIG. 1 illustrates a conventional crash pad for a vehicle, and FIG. 2 illustrates the cross-section of the conventional crash pad. Referring to FIGS. 1 and 2, a crash pad 100 includes a core layer 1, a foam layer 2 formed on the surface of the core layer 1, and a skin layer 3 formed on the surface of the foam layer 2. Herein, the skin layer 3 is formed of a material and a coating material, which may exhibit the appearance and feel of real leather, in order to emphasize design and sensory properties. In addition, the skin layer 3 may be subjected to a skin scoring process to form a scoring 4 for deploying an airbag (passenger airbag, PAB). The skin scoring is performed using processes using a laser, a hot knife, an ultrasonic knife, a cold knife, or milling.

However, when the skin scoring process is applied, problems arise such as an increase in process costs, an increase in process cycle time, an increase in labor cost and work time for controlling a material remaining after scoring, and exposure of the seam line on the surface of the crash pad due to scoring. To solve these problems caused by skin scoring, a process that eliminates skin scoring by applying a structure, covering a vacuum formed fabric, to the plastic core layer has been applied. However, there is no technology for eliminating the skin scoring from the crash pad composed of the skin layer, the foam layer and the plastic core layer.

Meanwhile, a skin for the crash pad may be manufactured using processes such as injection molding, vacuum molding, and powder slush molding (PSM). Among them, the powder slush molding process may provide a soft texture and clear embossing, so it is used in the manufacture of skins for interior parts used in high-class vehicles including mid-sized vehicles.

Prior art documents related to the present disclosure include Korean Patent Application Laid-Open No. 2015-0135708 (published on Dec. 3, 2015, entitled "Method of Manufacturing Crash Pad Skin).

SUMMARY

An object of the present disclosure is to provide a crash pad for a vehicle capable of omitting a skin scoring process when a skin layer is formed, due to excellent airbag deployment performance.

Another object of the present disclosure is to provide a crash pad for a vehicle having an excellent bonding strength between a skin layer and a foam layer.

Still another object of the present disclosure is to provide a crash pad for a vehicle having excellent sensory properties such as appearance and tactile sensation.

Yet another object of the present disclosure is to provide a crash pad for a vehicle having excellent lightweight and mechanical properties.

Still yet another object of the present disclosure is to provide a crash pad for a vehicle having excellent economic efficiency due to process simplification and cost reduction.

A further object of the present disclosure is to provide a method of manufacturing the crash pad for a vehicle.

One aspect of the present disclosure is directed to a crash pad for a vehicle. In an embodiment, the crash pad for a vehicle includes: a skin layer configured to form an outer surface of a crash pad including an airbag module; a core layer formed on a lower surface of the skin layer; and a foam layer formed between the core layer and the skin layer, wherein the skin layer has a tensile strength of 15 to 120 kgf/cm$^2$ and an elongation at break of 50 to 700% as measured in accordance with JIS K6301 standard.

In an embodiment, the skin layer may have a thickness of 0.1 to 1.0 mm, the foam layer may have a thickness of 3 to 15 mm, and the core layer may have a thickness of 1 to 6 mm.

In an embodiment, the core layer may be provided with an airbag door portion that deploys an airbag, the airbag door portion may have a tear line formed for deploying the airbag, and the tear line may be in any one of X-type, modified X-type, straight-type, H-type, and U-type.

In an embodiment, the skin layer may include one or more of thermoplastic polyurethane, thermoplastic polyolefin, polyvinyl chloride, and thermosetting polyurethane, and the skin layer may have a bonding strength of 0.25 kgf/cm or more as measured in accordance with ISO 813 standard, and a shore A hardness of 55 to 99 as measured in accordance with ASTM D2240 standard.

In an embodiment, the skin layer may be formed of a first composition, and the first composition may comprise 30 to 70 wt. % of a polyol compound; 5 to 40 wt. % of an alicyclic diisocyanate-based curing agent; and 5 to 30 wt. % of an aromatic glycol-based chain extender.

In an embodiment, the skin layer may be formed using a spraying process, a wrapping process, a hot pressing process, a powder slush molding (PSM) process or a vacuum forming process.

In an embodiment, the skin layer and the core layer may not be subjected to a scoring process.

Another aspect of the present disclosure is directed to a method of manufacturing a crash pad for a vehicle. In an embodiment, the method of manufacturing a crash pad for a vehicle including a skin layer configured to form an outer surface of a crash pad including an airbag module, a core layer formed on a lower surface of the skin layer, and a foam layer formed between the core layer and the skin layer, includes: placing a skin layer on a first mold; mounting a second mold on the first mold, the second mold having a core layer formed thereon; and forming a foam layer by injecting a foam layer-forming agent between the skin layer and the core layer and foaming the injected foam layer-forming agent.

In an embodiment, the skin layer may be formed without being subjected to a skin scoring process.

In an embodiment, the core layer may be provided with an airbag door portion that deploys an airbag, the airbag door portion may have a tear line formed for deploying the airbag, and the tear line may be in any one of X-type, modified X-type, straight-type, H-type, and U-type.

In an embodiment, the skin layer may be formed of one or more of thermoplastic polyurethane, thermoplastic polyolefin, polyvinyl chloride, and thermosetting polyurethane.

In an embodiment, the skin layer may be formed using a spraying process, a wrapping process, a hot pressing process, a powder slush molding (PSM) process or a vacuum forming process.

In an embodiment, the skin layer may be formed by fusing a first powder to a mold for a skin layer heated at 160 to 300° C.; and cooling the mold to which the first powder is fused, wherein the first powder may be formed of a first composition comprising 30 to 70 wt. % of a polyol compound, 5 to 40 wt. % of an alicyclic diisocyanate-based curing agent, and 5 to 30 wt. % of an aromatic glycol-based chain extender.

In an embodiment, the first powder may be formed by preparing an intermediate molded body by kneading the first composition; preparing a pulverized material by drying and pulverizing the intermediate molded body at −60° C. or less; subjecting the pulverized material to primary stirring at 80° C. or more; and subjecting the pulverized material subjected to the primary stirring, to secondary stirring.

In an embodiment, the intermediate molded body may be dried at −60° C. to −190° C.

In an embodiment, after the preparing of the pulverized material, the primary stirring may be performed by injecting 0.05 to 5 parts by weight of a drying agent into 100 parts by weight of the pulverized material.

In an embodiment, the primary stirring may be performed by stirring the pulverized material under the conditions of 500 to 1,500 rpm and 80 to 110° C., and the secondary stirring may be performing by stirring the pulverized material subjected to the primary stirring at 200 to 1,000 rpm.

In the crash pad for a vehicle according to the present disclosure, the airbag may be rapidly deployed when external impact is applied, even if the skin scoring process is omitted, a tear shape may be good, a bonding strength between the foam layer and the skin layer of the crash pad may be excellent, lightweight and mechanical properties may be excellent, and economic efficiency may be excellent due to process simplification and cost reduction caused by omission of the skin scoring process.

DETAILED DESCRIPTION OF THE ILLUSTRATED EMBODIMENTS

Hereinafter, a crash pad for a vehicle and a method of manufacturing the same will be described below with reference to the accompanying drawings through various exemplary embodiments.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

In the following description, the detailed description of related known technology or configuration will be omitted when it may obscure the subject matter of the present disclosure.

Further, the terms of constituent elements, which will be described hereinafter, are defined in consideration of their functions in the present disclosure and may be changed according to the intention of a user or an operator, or according to the custom. Accordingly, definitions of these terms must be based on the overall description herein.

As used herein, the terms "upper portion" and "lower portion" are defined based on the drawings, and the "upper portion" may be changed to the "lower portion" and the "lower portion" to the "upper portion" depending on the viewing point of view. In addition, as used herein, when an element is referred to as being "on" another element, it refers to not only a case where the element is formed directly located "on" the another element but also a case where an additional element exists between these elements.

Crash Pad for Vehicle

Figure 3:
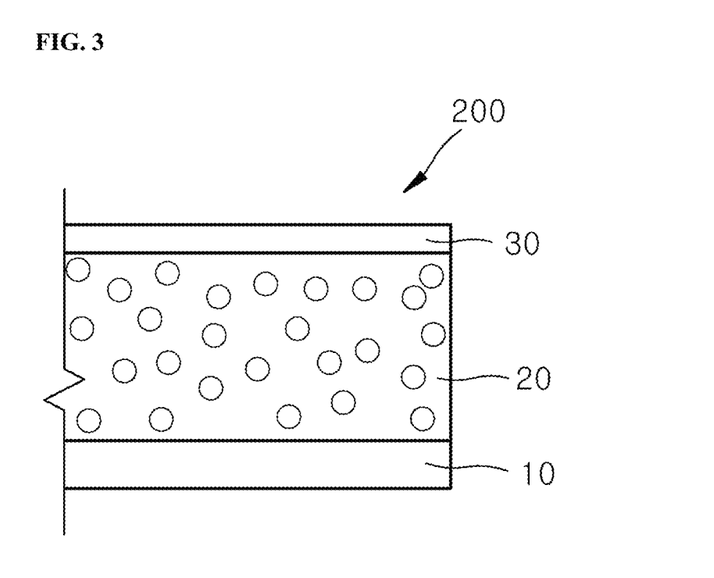
FIG. 3 illustrates the cross-section of a crash pad for a vehicle according to an embodiment of the present disclosure.

One aspect of the present disclosure relates to a crash pad for a vehicle. FIG. 3 illustrates the cross-section of a crash pad for a vehicle according to an embodiment of the present disclosure. Referring to FIG. 3, a crash pad 200 for a vehicle includes a skin layer 30 configured to form an outer surface of a crash pad including an airbag module; a core layer 10 formed on a lower surface of the skin layer 30; and a foam layer 20 formed between the core layer 10 and the skin layer 30.

Core Layer

The core layer 10 forms the front of the driver's seat and the passenger's seat, and functions to protect the occupant from external impact when a crash or rollover accident occurs. In addition, the core layer 10 may have an insertion hole through which an airbag module is mounted and have a mounting portion to which an air conditioner is attached, etc.

In an embodiment, the core layer may include: a matrix resin including a polycarbonate-based resin and a styrene-based resin; and an inorganic filler. The styrene-based resin may include an acrylonitrile-butadiene-styrene (ABS) resin. In an embodiment, the matrix resin may include a PC/ABS resin.

In an embodiment, the inorganic filler may include one or more of talc, whisker, glass fiber, carbon fiber, basalt fiber, and polymer fiber.

In an embodiment, the core layer may have a thickness of 1 to 6 mm. When the core layer is formed to have a thickness within the above range, the core layer may have excellent impact resistance. For example, the core layer may have a thickness of 3 to 4 mm. For example, the core layer may have a thickness of 1, 2, 3, 4, 5, or 6 mm.

Figure 4:
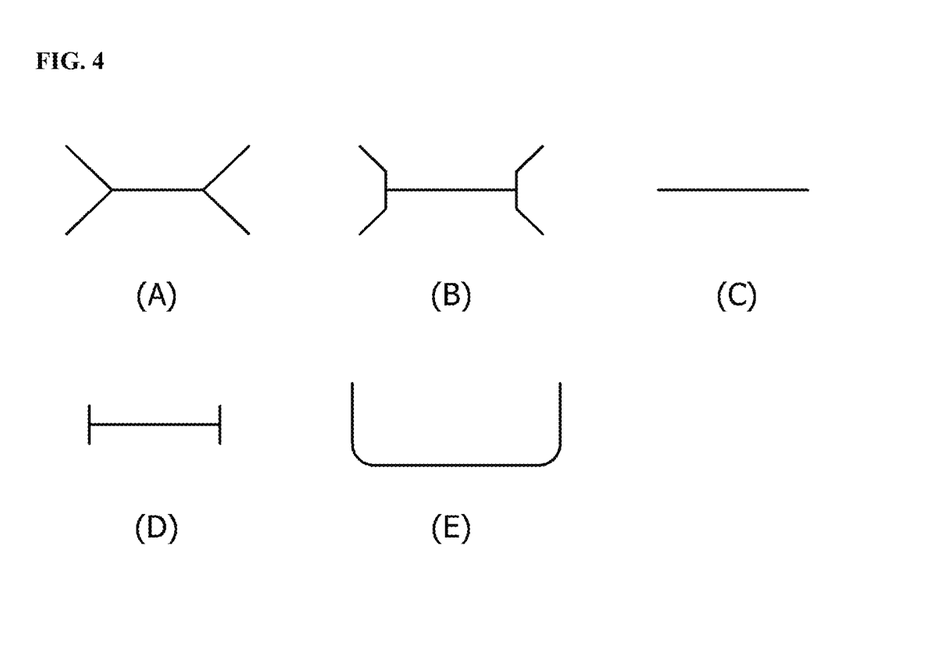
FIG. 4 illustrates a tear line formed on an airbag door portion of a crash pad for a vehicle according to an embodiment of the present disclosure.

FIG. 4 illustrates a tear line formed on an airbag door portion provided in the core layer of a crash pad for a vehicle according to an embodiment of the present disclosure. In an embodiment, the core layer may be provided with the airbag door portion that deploys an airbag, the airbag door portion may have a tear line formed for deploying the airbag, and the tear line may be in any one of X-type, modified X-type, straight-type, H-type, and U-type. When the tear line is formed in the above type, the airbag may be rapidly deployed when external impact is applied.

Foam Layer

The foam layer 20 functions to ensure the physical properties of the crash pad such as heat resistance, impact resistance, and light resistance, and to impart increased tactile sensation such as cushion feeling and increased sensory properties, to the vehicle occupant.

In an embodiment, the foam layer may be formed by injecting a foam layer-forming agent between the core layer and the skin layer to be described later and foaming the injected foam layer-forming agent. In an embodiment, the foam layer may include a polyurethane-based resin. In an embodiment, the foam layer may have a thickness of 3 to 15 mm. When the foam layer is formed to have a thickness within the above range, the foam layer may have excellent physical properties such as heat resistance, impact resistance, and light resistance, and show excellent airbag deployment performance when external impact is applied. For example, the foam layer may have a thickness of 3 to 8 mm. For another example, the foam layer may have a thickness of 3 to 5 mm. For example, the foam layer may have a thickness of 3, 4, 5, 6, 7, 8, 9, 10, 11, 12, 13, 14, or 15 mm.

Skin Layer

The skin layer 20 may have a thickness of 0.1 to 1.0 mm. When the skin layer is formed to have a thickness within the above range, the airbag may be easily deployed through the skin layer when external impact is applied even without a scoring process, and the crash pad may have excellent mechanical properties and an excellent bonding strength between the skin layer and the foam layer. For example, the skin layer 20 may have a thickness of 0.1, 0.2, 0.3, 0.4, 0.5, 0.6, 0.7, 0.8, 0.9, or 1.0 mm.

In an embodiment, the skin layer has a tensile strength of 15 to 120 kgf/cm$^2$ and an elongation at break of 50 to 700% as measured in accordance with JIS K6301 standard. For example, the skin layer having a thickness of 0.1 to 1.0 mm may have a tensile strength of 15 to 120 kgf/cm$^2$ and an elongation at break of 50 to 700% as measured at a test speed of 200 mm/min using a tensile tester (a universal testing machine (UTM) manufactured by Instron, Inc.) in accordance with JIS K6301 standard.

When the skin layer has the tensile strength of less than 15 kgf/cm$^2$, the skin layer is too low in strength and is easily damaged by external impact. When the skin layer has the tensile strength of greater than 120 kgf/cm$^2$, it may be difficult for the airbag to be deployed without a scoring process. For example, the skin layer may have a tensile strength of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 kgf/cm$^2$.

When the skin layer has the elongation at break range of less than 50%, it may be difficult for the airbag to be deployed rapidly through the skin layer when external impact is applied. When the skin layer has the elongation at break range of greater than 700%, the airbag may have a poor deployment shape. For example, the skin layer may have the elongation at break of 400 to 700%, or 400 to 600%. For another example, the skin layer may have the elongation at break of 400 to 500%. For example, the skin layer may have the elongation at break of 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690 or 700%.

In an embodiment, the skin layer may have a bonding strength of 0.25 kgf/cm or more as measured in accordance with ISO 813 standard. When the skin layer has the bonding strength of less than 0.25 kgf/cm, the skin layer may have a poor bonding strength between the skin layer and the foam layer, and the airbag may have a delayed deployment time or a poor tear shape. For example, the bonding strength between the skin layer and the foam layer may be 0.25 to 0.75 kgf/cm as measured in accordance with Hyundai-Kia Motors MS specification 256-29 (ISO 813 standard; 90 degree peeling method; peeling speed: 25 mm/min). For example, the skin layer may have the bonding strength between the skin layer and the foam layer of 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, or 0.75 kgf/cm as measured in accordance with Hyundai-Kia Motors MS specification 256-29 (ISO 813 standard; 90 degree peeling method; peeling speed: 25 mm/min).

In an embodiment, the skin layer may have a shore A hardness of 55 to 99 as measured in accordance with ASTM D2240 standard. In the above hardness range, the cushion feeling of the skin layer is prevented from deteriorating, so that the appearance may be excellent, and the airbag may be easily deployed even without a skin scoring process. For example, the skin layer may have a shore A hardness of 65 to 90. For example, the skin layer may have a shore A hardness of 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 as measured in accordance with ASTM D2240 standard.

In an embodiment, the skin layer may be formed of one or more of thermoplastic polyurethane, thermoplastic polyolefin, polyvinyl chloride, and thermosetting polyurethane. For example, the skin layer may include thermoplastic polyurethane.

In an embodiment, the skin layer may be formed using a spraying process, a wrapping process, a hot pressing process, a powder slush molding (PSM) process or a vacuum forming process.

In an embodiment, the skin layer may be formed of a first composition, and the first composition may comprise 30 to 70 wt. % of a polyol compound; 5 to 40 wt. % of an alicyclic diisocyanate-based curing agent; and 5 to 30 wt. % of an aromatic glycol-based chain extender.

Hereinafter, the components of the first composition will be described in more detail.

Polyol Compound

The polyol compound reacts with the alicyclic diisocyanate-based curing agent and a chain extender to form thermoplastic polyurethane or thermoplastic polyurethane elastomer.

In an embodiment, the polyol compound may have a number average molecular weight (Mn) of 500 to 6,000 g/mol. Under this molecular weight condition, the skin layer may have excellent chemical resistance and heat resistance.

For example, the polyol compound may include one or more of polyester polyol, polyether polyol, polycarbonate diol, and ether-containing polyester polyol, which have a number average molecular weight (Mn) of 500 to 6,000 g/mol. For example, the polyester polyol may include polycaprolactone diol. For example, the polyol compound may include ether-containing polyester polyol.

The ether-containing polyester polyol may be prepared by heating a first mixture, containing a multifunctional carboxylic acid compound, a multifunctional alcohol compound, and polytetramethylene ether glycol, to a first heating temperature of 140 to 160° C. and maintaining the first mixture at the first heating temperature for about 60 to 120 minutes; heating the first mixture to a second heating temperature of 210 to 230° C. and maintaining the first mixture at the second heating temperature for about 10 to 120 minutes; and applying a vacuum condition of 650 to 760 mmHg at the second heating temperature, and terminating the reaction when an acid value of the heated first mixture reaches 1 mgKOH/g or less. In an embodiment, the prepared ether-containing polyester polyol may have a hydroxyl value of 1 to 250 mgKOH/g. In the above range, the components of the composition may have excellent reactivity and heat resistance. For example, the hydroxyl value thereof may be 11.22 to 224.11 mgKOH/g.

In an embodiment, the multifunctional carboxylic acid compound may include one or more of adipic acid, sbelic acid, abelic acid, azelic acid, sebacic acid, dodecandioic acid, and trimeric acid.

In an embodiment, the multifunctional alcohol compound may include one or more of 1,4-butylene glycol, ethylene glycol, butane diol, hexane diol, and trimethylol propane.

In an embodiment, the polytetramethylene ether glycol (PTMG) having a hydroxyl value of 50 to 600 mgKOH/g may be used. When the hydroxyl value of the polytetramethylene ether glycol is less than 50 mgKOH/g, a problem may arise in that the polytetramethylene ether glycol may not chemically bond into the polyester polyol molecule structure to be synthesized, due to its excessively high molecular weight. When the hydroxyl value of the polytetramethylene ether glycol is more than 600 mgKOH/g, the polytetramethylene ether glycol may lower the crystallinity of the ether-containing polyester polyol to be synthesized, due to its excessively low molecular weight, resulting in the reduction in heat resistance and anti-aging performance caused by a reduction in the melting point, after the preparation of the thermoplastic polyurethane (TPU). For example, the hydroxyl value thereof may be 56.1 to 561 mgKOH/g.

In an embodiment, the polyol compound may be included in an amount of 30 to 70 wt. % based on the total weight of the first composition. Under the above condition, the viscosity of the first composition may be easily adjusted, and the first composition may be excellent in miscibility and mechanical properties. For example, the polyol compound may be included in an amount of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. % based on the total weight of the first composition.

Alicyclic Diisocyanate-Based Curing Agent

When the alicyclic diisocyanate-based curing agent is applied, it is possible to deploy the airbag even without a scoring process while ensuring the tensile strength of the skin layer of the present disclosure. In addition, when the alicyclic diisocyanate-based curing agent is applied, the skin composition of the present disclosure may be easily prepared in a homogeneous powder form.

In an embodiment, the alicyclic diisocyanate-based curing agent may include one or more of 4,4'-diphenylmethane diisocyanate, isoporone diisocyanate, and dicyclohexyl-methane-4,4'-diisocyanate ($H_{12}$MDI). When the alicyclic diisocyanate-based curing agent is applied, the present disclosure may have excellent tensile strength, and the elongation may be prevented from excessively increasing. Thus, the airbag may be deployed when external impact is applied, even without scoring the skin of the present disclosure. For example, the alicyclic diisocyanate-based curing agent may include dicyclohexylmethane-4,4'-diisocyanate.

In an embodiment, the alicyclic diisocyanate-based curing agent may be included in an amount of 5 to 40 wt. % by weight based on the total weight of the first composition. When the alicyclic diisocyanate-based curing agent is included in an amount within the above range, the curing agent reacts with the polyol to easily generate polyurethane, and the composition may be excellent in miscibility and moldability. For example, the alicyclic diisocyanate-based curing agent may be included in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt. % based on the total weight of the first composition.

Aromatic Glycol-Based Chain Extender

The aromatic glycol-based chain extender causes chain extension or crosslinking when preparing the first composition of the present disclosure, thus increasing the molecular weight of the composition, improving the mechanical properties, heat resistance and chemical resistance of the composition, lowering the elongation of the composition compared to a conventional art, and making airbag development possible even without the scoring process. In addition, the skin composition of the present disclosure may be easily prepared in a homogeneous powder form.

In an embodiment, the aromatic glycol-based chain extender may include hydroquinone bis(2-hydroxyethyl) ether (HQEE). When the aromatic glycol-based chain extender is applied, the composition of the present disclosure may have excellent moldability, and the skin of the present disclosure may have a desired tensile strength and hardness while the elongation of the skin is prevented from excessively increasing.

In an embodiment, the aromatic glycol-based chain extender may be included in an amount of 5 to 30 wt. % by weight based on the total weight of the first composition. When the aromatic glycol-based chain extender is included in an amount within the above range, the mechanical strength and heat resistance of the present disclosure may be excellent. For example, the aromatic glycol-based chain extender may be included in an amount of 5, 6, 7, 8, 9, 10, 11, 12, 13, 14, 15, 16, 17, 18, 19, 20, 21, 22, 23, 24, 25, 26, 27, 28, 29, or 30 wt. % based on the total weight of the first composition.

In an embodiment, the alicyclic diisocyanate-based curing agent and the aromatic glycol-based chain extender may be included at a weight ratio of 1:1 to 5:1. When they are included at a weight ratio within the above range, the present disclosure may have excellent mechanical properties such as tensile strength, the elongation may be prevented from excessively increasing, and moldability may be excellent. For example, the alicyclic diisocyanate-based curing agent and the aromatic glycol-based chain extender may be included at a weight ratio of 1.2:1 to 2:1.

Light Stabilizer

In an embodiment, the first composition may further comprise a hindered amine-based light stabilizer (HALS).

In an embodiment, the hindered amine-based light stabilizer may include a polymeric hindered amine-based light stabilizer having a number average molecular weight of 1,000 to 5,000 g/mol. When the hindered amine-based light stabilizer having a number average molecular weight within the above range is applied, the present disclosure may have excellent compatibility, light resistance, and long-term heat resistance and stability.

In an embodiment, the hindered amine-based light stabilizer may include poly[[6-(1,1,3,3-tetramethylbutylamino]-1,3,5-triazine-2,4-diyl][(2,2,6,6-tetramethyl-4-pyperidinyl)imino]-1,6-hexanediyl[(2,2,6,6-tetramethyl-4-pyperidinyl)imino].

In an embodiment, the hindered amine-based light stabilizer may be included in an amount of 0.1 to 5 wt. % by weight based on the total weight of the first composition. When the hindered amine-based light stabilizer is included in an amount within the above range, the present disclosure may have excellent compatibility and light resistance. For example, the hindered amine-based light stabilize may be included in an amount of 0.1, 0.2, 0.3, 0.4, 0.5, 0.6, 0.7, 0.8, 0.9, 1, 2, 3, 4, or 5 wt. % based on the total weight of the first composition.

Anti-Hydrolysis Agent

In an embodiment, the first composition may further comprise an anti-hydrolysis agent. For example, the first composition may comprise a carbodiimide-based anti-hydrolysis agent. For example, the first composition may comprise polycarbodiimide.

In an embodiment, the anti-hydrolysis agent may include a polymeric anti-hydrolysis agent having a number average molecular weight of 10,000 to 50,000 g/mol. In the above range, the present disclosure may have excellent heat resistance, and physical properties of the composition of the present disclosure may be prevented from deteriorating, when the composition is prepared.

In an embodiment, the anti-hydrolysis agent may be included in an amount of 0.05 to 5 wt. % based on the total weight of the first composition. When the anti-hydrolysis agent is included in an amount within the above range, the composition may have excellent compatibility and anti-hydrolysis properties. For example, the anti-hydrolysis agent may be included in an amount of 0.05, 0.06, 0.07, 0.08, 0.09, 0.1, 0.2, 0.3, 0.4, 0.5, 0.6, 0.7, 0.8, 0.9, 1, 2, 3, 4, or 5 wt. % based on the total weight of the first composition.

In an embodiment, the light stabilizer and the anti-hydrolysis agent may be included at a weight ratio of 1:1 to 5:1. When they are included at a weight ratio within the above range, unpredictable synergistic effects between the above-described components may occur, and thus the composition of the present disclosure may have excellent miscibility, mechanical properties, light resistance, heat resistance, and anti-hydrolysis properties.

In an embodiment, the first composition may have a melt flow index (185° C., a load of 2.16 kg) of 20 to 100 g/10 min as measured in accordance with ASTM D 1238. Under the above condition, the composition may have excellent miscibility and moldability during powder slush molding. For example, the first composition have a melt flow index (185° C., a load of 2.16 kg) of 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/10 min as measured in accordance with ASTM D 1238.

In an embodiment, the first composition may be prepared in the form of a powder having an average particle diameter of 140 to 300 μm and an apparent specific gravity of 0.3 g/cm$^3$ or more. Under conditions of the average particle diameter and the apparent specific gravity, the composition may have excellent miscibility and moldability during powder slush molding. For example, the composition may have the apparent specific gravity of 0.3 to 5 g/cm$^3$.

For another example, the composition may have the apparent specific gravity of 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.5, 2.0, 2.5, 3.0, 3.5, 4.0, 4.5, or 5.0 g/cm$^3$.

Method of Manufacturing Crash Pad for Vehicle

Figure 5:
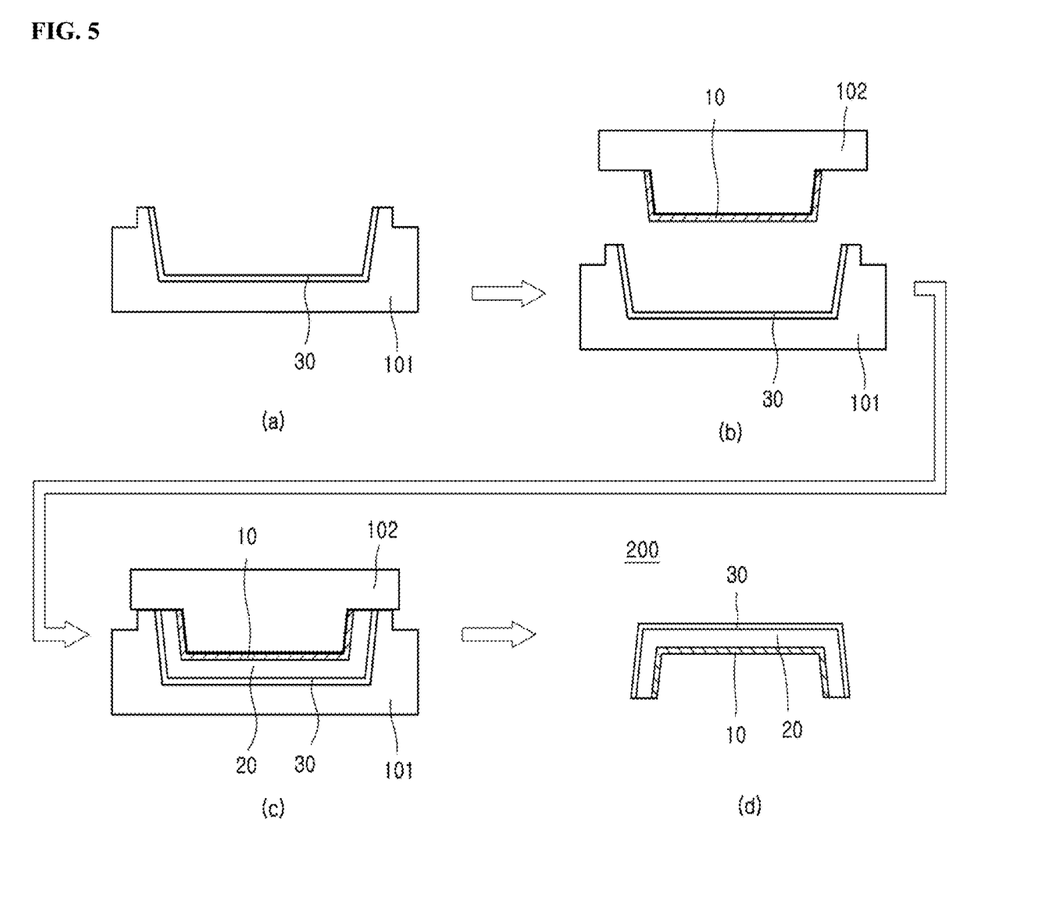
FIG. 5 schematically illustrates a method of manufacturing a crash pad for a vehicle according to an embodiment of the present disclosure.

Another aspect of the present disclosure relates to a method of manufacturing the crash pad for a vehicle. FIG. 5 schematically illustrates a method of manufacturing a crash pad for a vehicle according to an embodiment of the present disclosure. Referring to FIG. 5, the method of manufacturing a crash pad for a vehicle includes: a skin layer forming step (S10); a mold mounting step (S20); and a foam layer forming step (S30). More specifically, the method of manufacturing a crash pad for a vehicle including a skin layer configured to form an outer surface of a crash pad including an airbag module, a core layer formed on a lower surface of the skin layer, and a foam layer formed between the core layer and the skin layer, includes: placing a skin layer on a first mold (S10); mounting a second mold on the first mold, the second mold having a core layer formed thereon (S20); and forming a foam layer by injecting a foam layer-forming agent between the skin layer and the core layer and foaming the injected foam layer-forming agent (S30).

Hereinafter, each step of the method of manufacturing a crash pad for a vehicle according to the present disclosure will be described in detail.

Skin Layer Forming Step (S10)

The step is a step of forming the skin layer 30 on a first mold 101 as shown in FIG. 5(a).

In an embodiment, the skin layer may be forming using a spraying process, a wrapping process, a hot pressing process, a powder slush molding (PSM) process or a vacuum forming process.

In embodiment, the skin layer may be formed of one or more of thermoplastic polyurethane, thermoplastic polyolefin, polyvinyl chloride, and thermosetting polyurethane. For example, the skin layer may include thermoplastic polyurethane.

In the present disclosure, the skin layer may be formed without being subjected to a skin scoring process. In the present disclosure, the skin scoring process is omitted as described above, and thus economic efficiency may be excellent due to process simplification and cost reduction.

In an embodiment, the skin layer may be formed using a vacuum forming process. In an embodiment, the male vacuum forming may include: heating a fabric for a skin layer; and disposing the heated fabric for a skin layer on an upper surface of a mold for male vacuum forming and depressurizing the inside of the mold, but spraying air from the upper direction of the fabric for a skin layer to form the fabric. Upon the decompression, the pattern formed on the surface of the mold may be easily transferred to the fabric.

In another embodiment, the female vacuum forming may include: heating a fabric for a skin layer; and disposing the heated fabric for a skin layer between an upper mold and a lower mold for female vacuum forming, and decompressing the inside of the upper mold to form the fabric. Upon the decompression, the pattern formed on the surface of the lower mold may be easily transferred to the fabric for a skin layer.

In another embodiment, the skin layer may be formed using a powder slush molding process. For example, the skin layer may be formed by fusing a first powder to a mold for a skin layer heated at 160 to 300° C.; and cooling the mold to which the first powder is fused. When the powder slush molding process is applied, design freedom and pattern reproducibility are excellent, such that the appearance and aesthetics of the crash pad may be excellent.

For example, the skin layer may be prepared by filling a container whose upper surface is open with a first powder, attaching a mold for a skin layer heated to 160 to 300° C., to the upper surface of the container filled with the first powder, rotating the container to which the mold is attached, fusing the first powder to one surface of the mold, removing the excess first powder that was not fused, and then cooling and demolding the mold.

The first powder may be formed of a first composition comprising 30 to 70 wt. % of a polyol compound, 5 to 40 wt. % of an alicyclic diisocyanate-based curing agent, and 5 to 30 wt. % of an aromatic glycol-based chain extender. The first composition is the same as the foregoing description, so the detailed description thereof will be omitted.

The first powder may be prepared by an intermediate molded body preparation step (S11); a pulverized material preparation step (S12); a primary stirring step (S13); and a secondary stirring step (S14). More specifically, the first powder may be formed by preparing an intermediate molded body by kneading the first composition (S11); preparing a pulverized material by drying and pulverizing the intermediate molded body at −60° C. or less (S12); subjecting the pulverized material to primary stirring at 80° C. or more (S13); and subjecting the pulverized material subjected to the primary stirring, to secondary stirring (S14). Hereinafter, a method of preparing the first powder will be described in more detail.

Intermediate Molded Body Preparation Step (S11)

The step is a step of injecting the first composition into an extruder, and melting and kneading the first composition, thereby preparing a pellet-type intermediate molded body. For example, the first composition may be injected into the extruder, melted and kneaded at 130 to 250° C., and then extruded, cooled with water, and then cut, thereby preparing a pellet-type intermediate molded body. The components and contents of the first composition are the same as the foregoing description, so the detailed description thereof will be omitted.

Pulverized Material Preparation Step (S12)

The step is a step of preparing a pulverized material by drying and pulverizing the intermediate molded body at −60° C. or less. When the intermediate molded body is dried under the above temperature condition, the pulverized material may have a homogeneous particle diameter, moldability may be excellent during powder slush molding, and the manufactured skin layer may have excellent appearance quality or mechanical properties. For example, the intermediate molded body may be dried at −60° C. to −190° C.

Primary Stirring Step (S13)

The step is a step of subjecting the pulverized material to primary stirring at a temperature of 80° C. or more, thereby preparing a stirred material. When the pulverized material is subjected to primary stirring at a temperature of less than 80° C., the moldability during powder slush molding may deteriorate due to insufficient drying. For example, the primary stirring may be performed by injecting the pulverized material into a hot mixer and then stirring the pulverized material under conditions of a temperature of 80 to 110° C. and a blade rotation speed of 500 to 1500 rpm. Under the primary stirring conditions, a composition may be prepared in a homogeneous powder form, and the composition may have excellent the moldability during a powder slush molding.

In an embodiment, after the preparing of the pulverized material, the primary stirring may be performed by injecting 0.05 to 5 parts by weight of a drying agent into 100 parts by weight of the pulverized material. The pulverized material may be easily dried under the above conditions.

Secondary Stirring Step (S14)

The step is a step of subjecting the pulverized material subjected to the primary stirring, to secondary stirring. In an embodiment, the secondary stirring may be performed by injecting the stirred material into a cooling mixer and then stirring the stirred material at a rotation blade speed of 200 to 1,000 rpm for 30 to 300 seconds. Under the secondary stirring conditions, a composition may be prepared in a homogeneous powder form, and the composition may have excellent moldability during the powder slush molding. For example, in the secondary stirring, the pulverized material subjected to the primary stirring may be cooled to room temperature.

In an embodiment, the first composition prepared as described above may have an average particle diameter of 140 to 200 μm and an apparent specific gravity of 0.3 g/cm$^3$ or more. When the composition is prepared under conditions of the average particle diameter and the apparent specific gravity, the composition may have excellent miscibility and moldability during powder slush molding. For example, the composition may have the apparent specific gravity of 0.3 to 5 g/cm$^3$.

Mold Mounting Step (S20)

The step is a step of mounting a second mold 102 on the first mold 101, the second mold 102 having the core layer 10 formed thereon, as shown in FIG. 5(b).

Foam Layer Forming Step (S30)

The step is a step of forming the foam layer 20 by injecting a foam layer-forming agent between the skin layer 30 and the core layer 10 and foaming the injected foam layer-forming agent, as shown in FIG. 5(c). After the above process, the crash pad 200 for a vehicle may be demolded from the first mold 101 and the second mold 102, as shown in FIG. 5(d).

Hereinafter, the configuration and operation of the present disclosure will be described in more detail with reference to preferred embodiments of the present disclosure. These examples are merely presented as preferred examples of the present disclosure, and cannot be construed as limiting the present disclosure in any way. Contents not described herein can be sufficiently technically inferred by those skilled in the art, so the description thereof will be omitted.

EXAMPLES

The components used in the Examples and Comparative Examples are as follows.

(A) Polyol compound: (A1) Ether-containing polyester polyol was used. (A2) Polycarbonate diol was used.

(B) Curing agent: (B1) Dicyclohexylmethane-4,4'-diisocyanate was used as an alicyclic diisocyanate-based curing agent. (B2) Toluene diisocyanate was used as a curing agent.

(C) Chain extender: (C1) Hydroxyquinone bis(2-hydroxyethyl)ether was used as an aromatic glycol-based chain extender. (C2) 1,4-butylene glycol was used as a chain extender.

(D) Light stabilizer: A hindered amine-based light stabilizer having a number average molecular weight of 1,000 to 5,000 g/mol was used (Hostavin N30, manufactured by Clariant AG).

(E) Anti-hydrolysis agent: A carbodiimide-based anti-hydrolysis agent having a number average molecular weight of 10,000 to 50,000 g/mol was used (Stabilizer 9000, manufactured by Raschig GmbH).

Examples 1 to 3 and Comparative Examples 1 to 4: Preparation of First Powder Each of the first compositions having the components and contents of Table 1 below was injected into an extruder, melted and kneaded, and then water-cooled and cut to prepare an intermediate molded body in the form of a pellet. Thereafter, the intermediate molded body was dried and pulverized at −100° C. to prepare a pulverized material. Thereafter, the pulverized material was injected into a hot mixer and subjected to primary stirring under conditions of a temperature of 80 to 110° C. and a blade rotation speed of 500 to 1,500 rpm. Then, the pulverized material subjected to the primary stirring was injected into a cooling mixer, and subjected to secondary stirring for 30 to 300 seconds at a blade rotation speed of 200 to 1,000 rpm to prepare a first powder.

For the first powder of each of Examples 1 to 3 and Comparative Examples 1 to 4, a melt index (g/10 min), average particle diameter (μm), and apparent specific gravity (g/cm³) were measured. The results thereof are shown in Table 1. The melt index was measured under conditions of 185° C. and a load of 2.16 kg in accordance with ASTM D 1238 standard.

TABLE 1

| Classification (wt. %) | | Examples | | | Comparative Examples | | | |
|---|---|---|---|---|---|---|---|---|
| | | 1 | 2 | 3 | 1 | 2 | 3 | 4 |
| (A) | | 30 | 50 | 28 | 75 | 30 | 30 | 30 |
| (B) | (B1) | 40 | 30 | 40 | 13 | 45 | — | 40 |
|  | (B2) | — | — | — | — | — | 40 | — |
| (C) | (C1) | 28 | 18 | 30 | 10 | 23 | 28 | — |
|  | (C2) | — | — | — | — | — | — | 28 |
| (D) | | 1 | 1.5 | 1 | 1.5 | 1 | 1 | 1 |
| (E) | | 1 | 0.5 | 1 | 0.5 | 1 | 1 | 1 |
| Average particle diameter (μm) | | 150 | 200 | 148 | 210 | 188 | 188 | 168 |
| Apparent specific gravity (g/cm³) | | 0.35 | 0.40 | 0.35 | 0.42 | 0.38 | 0.37 | 0.37 |
| Melt index (g/10 min) | | 65 | 63 | 58 | 60 | 12 | 59 | 55 |

Examples 1 to 3 and Comparative Examples 1 to 4: Manufacture of Crash Pad

The first powder of Example 1 prepared as described above was formed by slush molding to manufacture a skin layer having a thickness shown in Table 2 below. Specifically, the skin layer was prepared by filling a container whose upper portion is open with the first powder, attaching a mold for a skin layer, heated to 160 to 220° C., to the upper surface of the container filled with the first powder, rotating the container to which the mold is attached, fusing the first powder to one surface of the mold, removing the excess first powder that was not fused, and then cooling and demolding the mold. Here, the skin layer was manufactured without being subjected to a skin scoring process. Thereafter, a core layer having a thickness of 3 to 4 mm and including a matrix resin containing a polypropylene-based resin, a styrene-diene-based polymer, and an inorganic filler was placed in a first mold, a second mold was mounted on the first mold, a foaming agent was injected between the core layer and the skin layer and the injected foaming agent was foamed to form a foam layer having a thickness of 3 to 5 mm and including a polyurethane foam. In addition, an airbag door portion that deploys the airbag was mounted on a part of the core layer, and a modified X-shaped tear line for deploying the airbag was formed on the airbag door portion, thereby manufacturing a crash pad for a vehicle.

Example 4

A crash pad for a vehicle was manufactured in the same manner as in Example 1, except that a skin layer having a thickness of 0.7 mm was applied.

Experimental Examples

For the crash pad of each of Examples 1 to 4 and Comparative Examples 1 to 4, physical properties were evaluated as follows. The results thereof are shown in Table 2 below.

(1) Hardness (shore A): Hardness was measured in accordance with ASTM D 2240.

(2) Tensile strength (kgf/cm²) and elongation at break (%): Tensile strength and elongation at break were measured by a JIS K6301 method using a universal testing machine (UTM) manufactured by Instron, Inc.

(3) Test for evaluation of airbag deployment performance: In accordance with Hyundai Motor ES84500-13 (passenger airbag invisible door performance specification), a passenger airbag (PAB) module was mounted on the crash pad manufactured in each of Examples 1 to 4 and Comparative Examples 1 to 4, and the inflator detonator was exploded by applying an electrical signal thereto under the conditions of room temperature (21° C.), low temperature (−35° C.) and high temperature (85° C.). Then, it was checked whether or not the airbag moves toward the seam line groove intentionally formed on the crash pad and is deployed through the seam line, whether or not the airbag is deployed within 8.0 m/s, and whether or not crash pad pieces are scattered during airbag deployment. The results of the checking ware determined as pass (P) in a case where all were satisfied, and fail (F) in a case where any one of them was not satisfied. The results thereof are shown in Table 2 below.

(4) Peel strength (kgf/cm): For the crash pad of each of Examples 1 to 4 and Comparative Examples 1 to 4, a bonding strength (kgf/cm) between the skin layer and the foam layer was measured in accordance with Hyundai Motor MS specification 256-29 (ISO 813 standard; 90 degree peeling method; peeling speed: 25 mm/min). The results thereof are shown in Table 2 below.

TABLE 2

| Classification | Examples | | | | Comparative Examples | | | |
| --- | --- | --- | --- | --- | --- | --- | --- | --- |
| | 1 | 2 | 3 | 4 | 1 | 2 | 3 | 4 |
| Skin layer thickness (mm) | 0.8 | 0.8 | 0.6 | 0.7 | 0.8 | 0.8 | 0.8 | 0.8 |
| Hardness (shore A) | 83 | 80 | 85 | 85 | 68 | 83 | 78 | 76 |
| Tensile strength (kgf/cm²) | 110 | 112 | 112 | 111 | 112 | 184 | 184 | 173 |
| Elongation (%) | 430 | 450 | 460 | 450 | 620 | 680 | 810 | 730 |
| Interlayer bonding strength (kgf/cm) | 0.45 | 0.45 | 0.50 | 0.45 | 0.35 | 0.15 | 0.35 | 0.40 |
| Airbag deployment performance: Room temperature (21° C.) | P | P | P | P | P | P | F | F |
| Airbag deployment performance: Low temperature (−35° C.) | P | P | P | P | F | F | F | F |
| Airbag deployment performance: High temperature (85° C.) | P | P | P | P | P | P | F | F |

Figure 6:
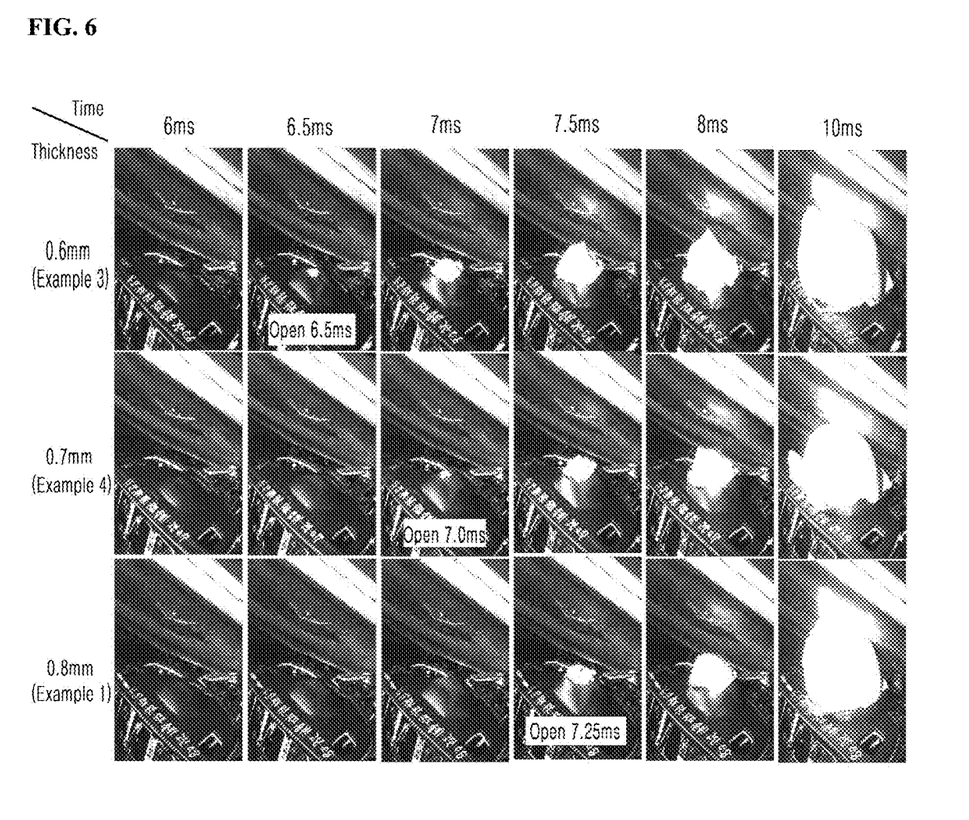
FIG. 6 is photographs obtained by testing the airbag deployment performance of Examples 1, 3 and 4.
Figure 7:
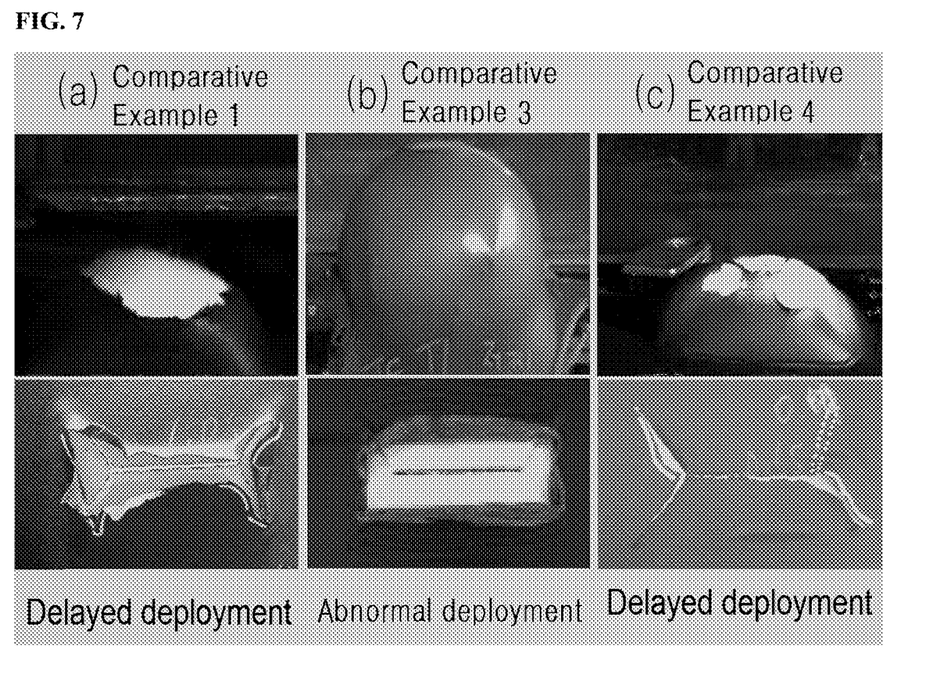
FIG. 7 is photographs obtained by capturing the surface of the crash pads after testing the airbag deployment performance of Comparative Examples 1, 3, and 4.
Figure 8:
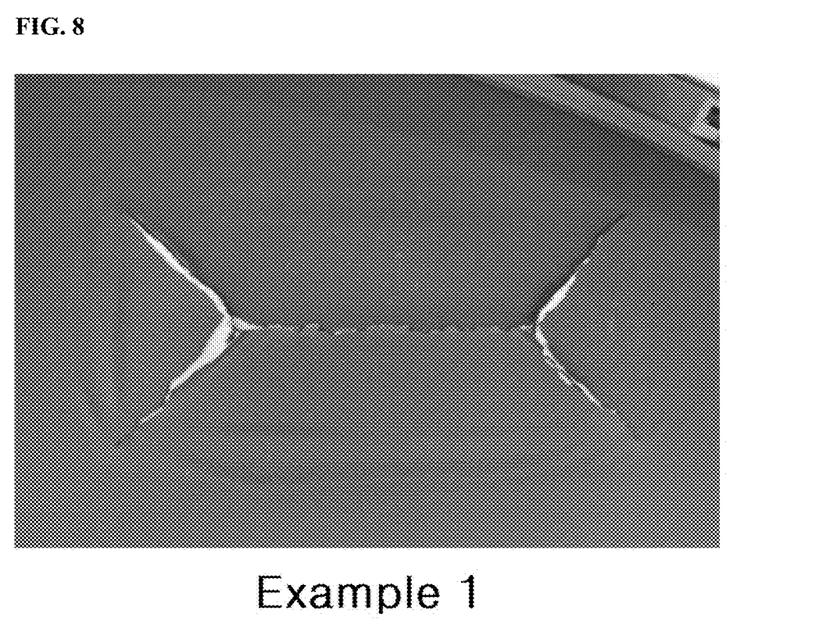
FIG. 8 is a photograph obtained by capturing the surface of the crash pad after testing the airbag deployment performance of Example 1.

FIG. 6 is photographs obtained by testing airbag deployment performance of Examples 1, 3 and 4, FIG. 7 is photographs obtained by capturing the surfaces of the crash pads after testing airbag deployment performance of Comparative Examples 1, 3, and 4, and FIG. 8 is a photograph obtained by capturing the surface of the crash pad after testing airbag deployment performance of Example 1.

Referring to the results shown in Table 2 and FIGS. 6 to 8, it could be seen that the crash pad of each of Examples 1 to 4 of the present disclosure enabled rapid deployment of the airbag even if a skin scoring process was not applied thereto, and the shape of the door portion of the crash pad after airbag deployment was also good. However, it could be seen that in the case of Comparative Examples 1 to 4 which did deviate from the conditions of the present disclosure, the bonding strength between the skin layer and the foam layer was lowered, the airbag was not rapidly deployed or the deployment shape was poor, and the deployment performance deteriorated.

Through the results of the Examples, it could be seen that when the skin layer was formed of a composition for a skin according to the present disclosure, the moldability and mechanical properties of the skin layer were excellent, the bonding strength between the skin layer and the foam layer was excellent, and thus the airbag was deployed rapidly when external impact is applied, even if the skin scoring process was omitted, and the shape of the door portion after airbag deployment was also good.

Simple modifications or changes of the present disclosure can be easily implemented by those of ordinary skill in the art, and all such modifications or changes should be construed as being included in the scope of the present disclosure.

What is claimed is:

1. A method of manufacturing a crash pad for a vehicle including a skin layer configured to form an outer surface of a crash pad including an airbag module, a core layer formed on a lower surface of the skin layer, and a foam layer formed between the core layer and the skin layer, the method comprising:
    placing a skin layer on a first mold,
        wherein the skin layer is formed by fusing a first powder to a mold for a skin layer heated at 160 to 300° C.; and
        cooling the mold to which the first powder is fused;
    mounting a second mold on the first mold, the second mold having a core layer formed thereon; and
    forming a foam layer by injecting a foam layer-forming agent between the skin layer and the core layer and foaming the injected foam layer-forming agent.

2. The method of claim 1, wherein the skin layer is formed without being subjected to a skin scoring process.

3. The method of claim 1, wherein the skin layer is formed of one or more of thermoplastic polyurethane, thermoplastic polyolefin, polyvinyl chloride, and thermosetting polyurethane.

4. The method of claim 1, wherein the skin layer is formed using a spraying process, a wrapping process, a hot pressing process, a powder slush molding (PSM) process or a vacuum forming process.

5. The method of claim 1, wherein the core layer has a tear line formed for deploying the airbag module, and
the tear line is in any one of X-type, modified X-type, straight-type, H-type, and U-type.

6. The method of claim 1,
wherein the first powder is formed of a first composition comprising 30 to 70 wt. % of a polyol compound, 5 to 40 wt. % of an alicyclic diisocyanate-based curing agent, and 5 to 30 wt. % of an aromatic glycol-based chain extender.

7. The method of claim 6, wherein the first powder is formed by preparing an intermediate molded body by kneading the first composition;
preparing a pulverized material by drying and pulverizing the intermediate molded body at −60° C. or less;
subjecting the pulverized material to primary stirring at 80° C. or more; and
subjecting the pulverized material subjected to the primary stirring, to secondary stirring.

8. The method of claim 7, wherein the intermediate molded body is dried at −60° C. to −190° C.

9. The method of claim 7, wherein the primary stirring is performed by stirring the pulverized material under the conditions of 500 to 1,500 rpm and 80 to 110° C., and
the secondary stirring is performed by stirring the pulverized material subjected to the primary stirring at 200 to 1,000 rpm.

* * * * *